(12) United States Patent
Van Vleck et al.

(10) Patent No.: US 9,167,241 B2
(45) Date of Patent: *Oct. 20, 2015

(54) VIDEO QUALITY TESTING BY ENCODING AGGREGATED CLIPS

(75) Inventors: Paul Van Vleck, Austin, TX (US); Philip T. Kortum, Houston, TX (US); Marc A. Sullivan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1352 days.

This patent is subject to a terminal disclaimer.

(21) Appl. No.: 12/962,066

(22) Filed: Dec. 7, 2010

(65) Prior Publication Data

US 2011/0075727 A1    Mar. 31, 2011

Related U.S. Application Data

(63) Continuation of application No. 11/191,154, filed on Jul. 27, 2005, now Pat. No. 7,873,102.

(51) Int. Cl.
*H04N 7/12* (2006.01)
*H04N 17/00* (2006.01)

(52) U.S. Cl.
CPC .................................. *H04N 17/004* (2013.01)

(58) Field of Classification Search
CPC .................................................. H04N 17/004
See application file for complete search history.

(56) References Cited

U.S. PATENT DOCUMENTS

| | | |
|---|---|---|
| 4,243,147 A | 1/1981 | Twitchell et al. |
| 4,356,509 A | 10/1982 | Skerlos et al. |
| 4,768,926 A | 9/1988 | Gilbert, Jr. |
| 4,907,079 A | 3/1990 | Turner et al. |
| 5,126,731 A | 6/1992 | Cromer, Jr. et al. |
| 5,163,340 A | 11/1992 | Bender |
| 5,475,835 A | 12/1995 | Hickey |
| 5,532,748 A | 7/1996 | Naimpally |
| 5,541,917 A | 7/1996 | Farris |
| 5,589,892 A | 12/1996 | Knee et al. |
| 5,592,477 A | 1/1997 | Farris et al. |
| 5,610,916 A | 3/1997 | Kostreski et al. |
| 5,613,012 A | 3/1997 | Hoffman et al. |
| 5,650,831 A | 7/1997 | Farwell |
| 5,651,332 A | 7/1997 | Moore et al. |
| 5,656,898 A | 8/1997 | Kalina |
| 5,675,390 A | 10/1997 | Schindler et al. |

(Continued)

FOREIGN PATENT DOCUMENTS

| | | |
|---|---|---|
| WO | 9963759 A2 | 12/1999 |
| WO | 0028689 A2 | 5/2000 |

(Continued)

OTHER PUBLICATIONS

Kapinos, S. "Accenda Universal Remote Control Targets Needs of Elderly, Visually Impaired, Physically Challenged . . . and the Rest of Us" Innotech Systems, Inc. Press Release, Port Jefferson, NY, Dec. 15, 2002, 4 pp.

*Primary Examiner* — Nhon Diep
(74) *Attorney, Agent, or Firm* — Toler Law Group, PC

(57) ABSTRACT

A method includes receiving a first video clip and a second video clip. The first video clip and the second video clip are variable-bit-rate (VBR)-encoded to form a VBR-encoded aggregated video content item. The VBR-encoding of the first video clip is based on an encoding complexity of the second video clip.

20 Claims, 2 Drawing Sheets

(56) References Cited

U.S. PATENT DOCUMENTS

| | | | |
|---|---|---|---|
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,774,357 A | 6/1998 | Hoffberg et al. |
| 5,793,438 A | 8/1998 | Bedard |
| 5,805,719 A | 9/1998 | Pare, Jr. et al. |
| 5,818,438 A | 10/1998 | Howe et al. |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,900,867 A | 5/1999 | Schindler et al. |
| 5,910,970 A | 6/1999 | Lu |
| 5,933,498 A | 8/1999 | Schneck et al. |
| 5,953,318 A | 9/1999 | Nattkemper et al. |
| 5,956,024 A | 9/1999 | Strickland et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,014,184 A | 1/2000 | Knee et al. |
| 6,021,158 A | 2/2000 | Schurr et al. |
| 6,021,167 A | 2/2000 | Wu |
| 6,028,600 A | 2/2000 | Rosin et al. |
| 6,029,045 A | 2/2000 | Picco et al. |
| 6,038,251 A | 3/2000 | Chen |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,137,839 A | 10/2000 | Mannering et al. |
| 6,166,734 A | 12/2000 | Nahi et al. |
| 6,167,084 A * | 12/2000 | Wang et al. ............... 375/240.02 |
| 6,181,335 B1 | 1/2001 | Hendricks et al. |
| 6,192,282 B1 | 2/2001 | Smith et al. |
| 6,195,692 B1 | 2/2001 | Hsu |
| 6,215,483 B1 | 4/2001 | Zigmond |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,311,214 B1 | 10/2001 | Rhoads |
| 6,314,409 B2 | 11/2001 | Schneck et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 | 10/2002 | Krueger et al. |
| 6,463,585 B1 | 10/2002 | Hendricks et al. |
| 6,481,011 B1 | 11/2002 | Lemmons |
| 6,486,892 B1 | 11/2002 | Stern |
| 6,492,913 B2 | 12/2002 | Vierthaler et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |
| 6,522,769 B1 | 2/2003 | Rhoads et al. |
| 6,526,577 B1 | 2/2003 | Knudson et al. |
| 6,529,949 B1 | 3/2003 | Getsin et al. |
| 6,535,269 B2 * | 3/2003 | Sherman et al. ............... 352/6 |
| 6,535,590 B2 | 3/2003 | Tidwell et al. |
| 6,538,704 B1 | 3/2003 | Grabb et al. |
| 6,542,740 B1 | 4/2003 | Olgaard et al. |
| 6,557,030 B1 | 4/2003 | Hoang |
| 6,567,982 B1 | 5/2003 | Howe et al. |
| 6,577,595 B1 | 6/2003 | Counterman |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,622,148 B1 | 9/2003 | Noble et al. |
| 6,622,307 B1 | 9/2003 | Ho |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,931 B1 | 3/2004 | Schaffer et al. |
| 6,714,264 B1 | 3/2004 | Kempisty |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |
| 6,785,716 B1 | 8/2004 | Nobakht |
| 6,788,709 B1 | 9/2004 | Hyakutake |
| 6,804,824 B1 | 10/2004 | Potrebic et al. |
| 6,826,775 B1 | 11/2004 | Howe et al. |
| 6,828,993 B1 | 12/2004 | Hendricks et al. |
| 6,909,874 B2 | 6/2005 | Holtz et al. |
| 6,938,021 B2 | 8/2005 | Shear et al. |
| 7,075,990 B2 | 7/2006 | Costa |
| 7,236,687 B2 | 6/2007 | Kato et al. |
| 7,349,474 B2 | 3/2008 | Bagni et al. |
| 7,424,058 B1 | 9/2008 | Staley et al. |
| 7,636,768 B2 | 12/2009 | Yang et al. |
| 7,636,933 B2 | 12/2009 | Kortum et al. |
| 8,508,597 B2 * | 8/2013 | Bourret et al. ............... 348/192 |
| 2001/0011261 A1 | 8/2001 | Mullen-Schultz |

(56) References Cited

U.S. PATENT DOCUMENTS

| | | |
|---|---|---|
| 2001/0016945 A1 | 8/2001 | Inoue |
| 2001/0016946 A1 | 8/2001 | Inoue |
| 2001/0034664 A1 | 10/2001 | Brunson |
| 2001/0044794 A1 | 11/2001 | Nasr et al. |
| 2001/0048677 A1 | 12/2001 | Boys |
| 2001/0049826 A1 | 12/2001 | Wilf |
| 2001/0054008 A1 | 12/2001 | Miller et al. |
| 2001/0054009 A1 | 12/2001 | Miller et al. |
| 2001/0054067 A1 | 12/2001 | Miller et al. |
| 2001/0056350 A1 | 12/2001 | Calderone et al. |
| 2002/0001303 A1 | 1/2002 | Boys |
| 2002/0001310 A1 | 1/2002 | Mai et al. |
| 2002/0002496 A1 | 1/2002 | Miller et al. |
| 2002/0003166 A1 | 1/2002 | Miller et al. |
| 2002/0007307 A1 | 1/2002 | Miller et al. |
| 2002/0007313 A1 | 1/2002 | Mai et al. |
| 2002/0007485 A1 | 1/2002 | Rodriguez et al. |
| 2002/0010639 A1 | 1/2002 | Howey et al. |
| 2002/0010745 A1 | 1/2002 | Schneider |
| 2002/0010935 A1 | 1/2002 | Sitnik |
| 2002/0016736 A1 | 2/2002 | Cannon et al. |
| 2002/0022963 A1 | 2/2002 | Miller et al. |
| 2002/0022970 A1 | 2/2002 | Noll et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0026475 A1 | 2/2002 | Marmor |
| 2002/0029181 A1 | 3/2002 | Miller et al. |
| 2002/0030105 A1 | 3/2002 | Miller et al. |
| 2002/0032603 A1 | 3/2002 | Yeiser |
| 2002/0035404 A1 | 3/2002 | Ficco et al. |
| 2002/0040475 A1 | 4/2002 | Yap et al. |
| 2002/0042915 A1 | 4/2002 | Kubischta et al. |
| 2002/0046093 A1 | 4/2002 | Miller et al. |
| 2002/0049635 A1 | 4/2002 | Mai et al. |
| 2002/0054087 A1 | 5/2002 | Noll et al. |
| 2002/0054750 A1 | 5/2002 | Ficco et al. |
| 2002/0059163 A1 | 5/2002 | Smith |
| 2002/0059425 A1 | 5/2002 | Belfiore et al. |
| 2002/0059599 A1 | 5/2002 | Schein et al. |
| 2002/0065717 A1 | 5/2002 | Miller et al. |
| 2002/0067438 A1 | 6/2002 | Baldock |
| 2002/0069220 A1 | 6/2002 | Tran |
| 2002/0069282 A1 | 6/2002 | Reisman |
| 2002/0069294 A1 | 6/2002 | Herkersdorf et al. |
| 2002/0072970 A1 | 6/2002 | Miller et al. |
| 2002/0078442 A1 | 6/2002 | Reyes et al. |
| 2002/0097261 A1 | 7/2002 | Gottfurcht et al. |
| 2002/0106119 A1 | 8/2002 | Foran et al. |
| 2002/0112239 A1 | 8/2002 | Goldman |
| 2002/0116392 A1 | 8/2002 | McGrath et al. |
| 2002/0124055 A1 | 9/2002 | Reisman |
| 2002/0128061 A1 | 9/2002 | Blanco |
| 2002/0129094 A1 | 9/2002 | Reisman |
| 2002/0133402 A1 | 9/2002 | Faber et al. |
| 2002/0138840 A1 | 9/2002 | Schein et al. |
| 2002/0152264 A1 | 10/2002 | Yamasaki |
| 2002/0169611 A1 | 11/2002 | Guerra et al. |
| 2002/0170063 A1 | 11/2002 | Ansari et al. |
| 2002/0173344 A1 | 11/2002 | Cupps et al. |
| 2002/0188955 A1 | 12/2002 | Thompson et al. |
| 2002/0193997 A1 | 12/2002 | Fitzpatrick et al. |
| 2002/0194601 A1 | 12/2002 | Perkes et al. |
| 2002/0198874 A1 | 12/2002 | Nasr et al. |
| 2003/0005445 A1 | 1/2003 | Schein et al. |
| 2003/0009771 A1 | 1/2003 | Chang |
| 2003/0012365 A1 | 1/2003 | Goodman |
| 2003/0014750 A1 | 1/2003 | Kamen |
| 2003/0018975 A1 | 1/2003 | Stone |
| 2003/0023435 A1 | 1/2003 | Josephson |
| 2003/0023440 A1 | 1/2003 | Chu |
| 2003/0028890 A1 | 2/2003 | Swart et al. |
| 2003/0033416 A1 | 2/2003 | Schwartz |
| 2003/0043915 A1 | 3/2003 | Costa et al. |
| 2003/0046091 A1 | 3/2003 | Arneson et al. |
| 2003/0046689 A1 | 3/2003 | Gaos |
| 2003/0056223 A1 | 3/2003 | Costa et al. |
| 2003/0058277 A1 | 3/2003 | Bowman-Amuah |
| 2003/0061611 A1 | 3/2003 | Pendakur |
| 2003/0071792 A1 | 4/2003 | Safadi |
| 2003/0093793 A1 | 5/2003 | Gutta |
| 2003/0100340 A1 | 5/2003 | Cupps et al. |
| 2003/0110161 A1 | 6/2003 | Schneider |
| 2003/0110503 A1 | 6/2003 | Perkes |
| 2003/0126136 A1 | 7/2003 | Omoigui |
| 2003/0135771 A1 | 7/2003 | Cupps et al. |
| 2003/0141987 A1 | 7/2003 | Hayes |
| 2003/0145321 A1 | 7/2003 | Bates et al. |
| 2003/0149989 A1 | 8/2003 | Hunter et al. |
| 2003/0153353 A1 | 8/2003 | Cupps et al. |
| 2003/0153354 A1 | 8/2003 | Cupps et al. |
| 2003/0159026 A1 | 8/2003 | Cupps et al. |
| 2003/0160830 A1 | 8/2003 | DeGross |
| 2003/0163601 A1 | 8/2003 | Cupps et al. |
| 2003/0163666 A1 | 8/2003 | Cupps et al. |
| 2003/0172380 A1 | 9/2003 | Kikinis |
| 2003/0182237 A1 | 9/2003 | Costa et al. |
| 2003/0182420 A1 | 9/2003 | Jones et al. |
| 2003/0185232 A1 | 10/2003 | Moore et al. |
| 2003/0187641 A1 | 10/2003 | Moore et al. |
| 2003/0187646 A1 | 10/2003 | Smyers et al. |
| 2003/0187800 A1 | 10/2003 | Moore et al. |
| 2003/0189509 A1 | 10/2003 | Hayes et al. |
| 2003/0189589 A1 | 10/2003 | LeBlanc et al. |
| 2003/0194141 A1 | 10/2003 | Kortum et al. |
| 2003/0194142 A1 | 10/2003 | Kortum et al. |
| 2003/0208396 A1 | 11/2003 | Miller et al. |
| 2003/0208758 A1 | 11/2003 | Schein et al. |
| 2003/0226044 A1 | 12/2003 | Cupps et al. |
| 2003/0226145 A1 | 12/2003 | Marsh |
| 2003/0229900 A1 | 12/2003 | Reisman |
| 2004/0003041 A1 | 1/2004 | Moore et al. |
| 2004/0003403 A1 | 1/2004 | Marsh |
| 2004/0006769 A1 | 1/2004 | Ansari et al. |
| 2004/0006772 A1 | 1/2004 | Ansari et al. |
| 2004/0010602 A1 | 1/2004 | Van Vleck et al. |
| 2004/0015997 A1 | 1/2004 | Ansari et al. |
| 2004/0030750 A1 | 2/2004 | Moore et al. |
| 2004/0031058 A1 | 2/2004 | Reisman |
| 2004/0031856 A1 | 2/2004 | Atsmon et al. |
| 2004/0034877 A1 | 2/2004 | Nogues |
| 2004/0049728 A1 | 3/2004 | Langford |
| 2004/0064351 A1 | 4/2004 | Mikurak |
| 2004/0068740 A1 | 4/2004 | Fukuda et al. |
| 2004/0068753 A1 | 4/2004 | Robertson et al. |
| 2004/0070491 A1 | 4/2004 | Huang et al. |
| 2004/0073918 A1 | 4/2004 | Ferman et al. |
| 2004/0098571 A1 | 5/2004 | Falcon |
| 2004/0107125 A1 | 6/2004 | Guheen et al. |
| 2004/0107439 A1 | 6/2004 | Hassell et al. |
| 2004/0111745 A1 | 6/2004 | Schein et al. |
| 2004/0111756 A1 | 6/2004 | Stuckman et al. |
| 2004/0117813 A1 | 6/2004 | Karaoguz et al. |
| 2004/0117818 A1 | 6/2004 | Karaoguz et al. |
| 2004/0117824 A1 | 6/2004 | Karaoguz et al. |
| 2004/0128342 A1 | 7/2004 | Maes et al. |
| 2004/0139173 A1 | 7/2004 | Karaoguz et al. |
| 2004/0143600 A1 | 7/2004 | Musgrove et al. |
| 2004/0143652 A1 | 7/2004 | Grannan et al. |
| 2004/0148408 A1 | 7/2004 | Nadarajah |
| 2004/0150676 A1 | 8/2004 | Gottfurcht et al. |
| 2004/0183839 A1 | 9/2004 | Gottfurcht et al. |
| 2004/0194136 A1 | 9/2004 | Finseth et al. |
| 2004/0198386 A1 | 10/2004 | Dupray |
| 2004/0201600 A1 | 10/2004 | Kakivaya et al. |
| 2004/0210633 A1 | 10/2004 | Brown et al. |
| 2004/0210935 A1 | 10/2004 | Schein et al. |
| 2004/0213271 A1 | 10/2004 | Lovy et al. |
| 2004/0221302 A1 | 11/2004 | Ansari et al. |

(56) References Cited

U.S. PATENT DOCUMENTS

| | | |
|---|---|---|
| 2004/0223485 A1 | 11/2004 | Arellano et al. |
| 2004/0226035 A1 | 11/2004 | Hauser, Jr. |
| 2004/0226045 A1 | 11/2004 | Nadarajah |
| 2004/0239624 A1 | 12/2004 | Ramian |
| 2004/0252119 A1 | 12/2004 | Hunleth et al. |
| 2004/0252120 A1 | 12/2004 | Hunleth et al. |
| 2004/0252769 A1 | 12/2004 | Costa et al. |
| 2004/0252770 A1 | 12/2004 | Costa et al. |
| 2004/0260407 A1 | 12/2004 | Wimsatt |
| 2004/0261116 A1 | 12/2004 | McKeown et al. |
| 2004/0267729 A1 | 12/2004 | Swaminathan et al. |
| 2004/0268393 A1 | 12/2004 | Hunleth et al. |
| 2005/0027851 A1 | 2/2005 | McKeown et al. |
| 2005/0038814 A1 | 2/2005 | Iyengar et al. |
| 2005/0044280 A1 | 2/2005 | Reisman |
| 2005/0097612 A1 | 5/2005 | Pearson et al. |
| 2005/0132295 A1 | 6/2005 | Noll et al. |
| 2005/0149988 A1 | 7/2005 | Grannan |
| 2005/0195961 A1 | 9/2005 | Pasquale et al. |
| 2006/0026663 A1 | 2/2006 | Kortum et al. |
| 2006/0037043 A1 | 2/2006 | Kortum et al. |
| 2006/0037083 A1 | 2/2006 | Kortum et al. |
| 2006/0048178 A1 | 3/2006 | Kortum et al. |
| 2006/0077921 A1 | 4/2006 | Radpour |
| 2006/0114360 A1 | 6/2006 | Kortum et al. |
| 2006/0117374 A1 | 6/2006 | Kortum et al. |
| 2006/0123445 A1 | 6/2006 | Sullivan et al. |
| 2006/0156372 A1 | 7/2006 | Cansler et al. |
| 2006/0158368 A1 | 7/2006 | Walter et al. |
| 2006/0161953 A1 | 7/2006 | Walter et al. |
| 2006/0168610 A1 | 7/2006 | Williams et al. |
| 2006/0170582 A1 | 8/2006 | Kortum et al. |
| 2006/0174279 A1 | 8/2006 | Sullivan et al. |
| 2006/0174309 A1 | 8/2006 | Pearson |
| 2006/0179466 A1 | 8/2006 | Pearson et al. |
| 2006/0179468 A1 | 8/2006 | Pearson |
| 2006/0184991 A1 | 8/2006 | Schlamp et al. |
| 2006/0184992 A1 | 8/2006 | Kortum et al. |
| 2006/0190402 A1 | 8/2006 | Patron et al. |
| 2006/0218590 A1 | 9/2006 | White |
| 2006/0230421 A1 | 10/2006 | Pierce et al. |
| 2006/0236343 A1 | 10/2006 | Chang |
| 2006/0268917 A1 | 11/2006 | Nadarajah |
| 2006/0282785 A1 | 12/2006 | McCarthy et al. |
| 2006/0290814 A1 | 12/2006 | Walter |
| 2006/0294559 A1 | 12/2006 | Ansari et al. |
| 2006/0294561 A1 | 12/2006 | Grannan et al. |
| 2006/0294568 A1 | 12/2006 | Walter |
| 2007/0011133 A1 | 1/2007 | Chang |
| 2007/0011250 A1 | 1/2007 | Kortum et al. |
| 2007/0021211 A1 | 1/2007 | Walter |

FOREIGN PATENT DOCUMENTS

| | | |
|---|---|---|
| WO | 0160066 A1 | 8/2001 |
| WO | 0217627 A2 | 2/2002 |
| WO | 02058382 A1 | 7/2002 |
| WO | 03003710 A2 | 1/2003 |
| WO | 03025726 A1 | 3/2003 |
| WO | 2004018060 A2 | 3/2004 |
| WO | 2004032514 A1 | 4/2004 |
| WO | 2004062279 A1 | 7/2004 |
| WO | 2005045554 A2 | 5/2005 |

* cited by examiner

VIDEO QUALITY TESTING BY ENCODING AGGREGATED CLIPS

CLAIM OF PRIORITY

This application is a continuation patent application of, and claims priority from, U.S. patent application Ser. No. 11/191,154, filed on Jul. 27, 2005 and entitled "VIDEO QUALITY TESTING BY ENCODING AGGREGATED CLIPS," which is hereby incorporated by reference in its entirety.

FIELD OF THE DISCLOSURE

The present disclosure relates to video quality testing.

BACKGROUND

Variable-bit-rate (VBR) encoding refers to a video encoder's ability to vary an amount of data used to encode a scene based on an overall complexity of information being encoded. A video scene with a large amount of detail and movement, for example, may be encoded using more data than a scene that is relatively simple and lacks motion.

Pre-encoding refers to encoding an entire video before the video is delivered. Pre-encoding may involve an encoder analyzing the entire video to be encoded to generate a more sophisticated encoding. When encoding a movie, for example, the entire movie can be analyzed to determine which parts of the movie are relatively complex and which parts are relatively simple. The encoder can pre-allocate, from an overall data budget, a specific amount of data for each section of the movie. Such an approach allows the encoder to maintain a limit on the overall size of an output file while optimizing the allocation of data to specific parts of the movie. Video quality can be optimized within the constraint of an overall file size.

The combination of VBR and pre-encoding enables higher-quality video (when compared to other encoding mechanisms) to be delivered using the same amount of data. Pre-encoded VBR content is a common type of encoded content for many download-to-play video services found on the Internet.

Encoding schemes and/or video distribution and display systems are evaluated using video quality and acceptability test procedures. These procedures often involve multiple pieces of video content to provide a diverse set over which to test.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
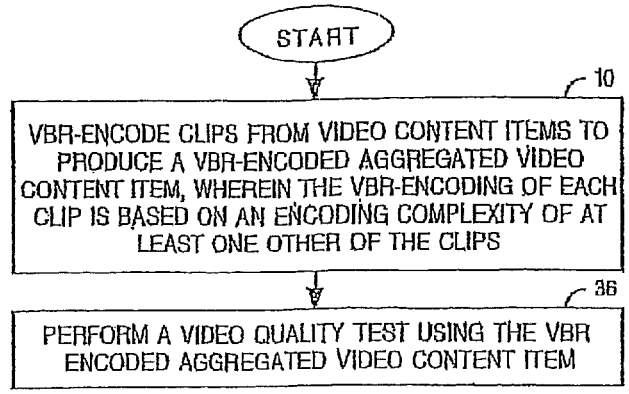
FIG. 1 is a flow chart of an embodiment of a method of performing a video quality test.

According to a particular embodiment, a method includes receiving a first video clip and a second video clip. The first video clip and the second video clip are variable-bit-rate (VBR)-encoded to form a VBR-encoded aggregated video content item. The VBR-encoding of the first video clip is based on an encoding complexity of the second video clip.

According to a particular embodiment, an apparatus includes a video quality test device that performs a video quality test of a VBR-encoded aggregated video content item. The VBR-encoded aggregated video content item includes a plurality of clips from a plurality of video content items and an encoding of at least one clip of the plurality of clips is based on an encoding complexity of another clip of the plurality of clips.

According to a particular embodiment, an apparatus includes a tangible computer-readable medium storing data corresponding to a variable bit rate (VBR)-encoded aggregated video content item. The VBR-encoded aggregated video content item includes a plurality of video clips. An encoding of at least one clip of the plurality of video clips is based on an encoding complexity of another video clip of the plurality of video clips.

Multiple pieces of video content used in a video quality test may comprise multiple full-length movies, for example. For purposes of illustration and example, consider a video quality test that involves thirty full-length movies having an average length of roughly ninety minutes per movie. To test multiple different encoding schemes, a significant amount of time is required to encode the multiple full-length movies in each of the encoding schemes.

To save money on costs of encoding in a video quality test, a single clip from each movie may be encoded rather than the entire movie. For example, a three-minute clip may be encoded rather than an entire ninety-minute movie to reduce an amount of encoding by a factor of about 30×. However, for testing pre-encoded VBR schemes, a first amount of data from an encoding of the three-minute clip by itself is not necessarily the same as a second amount of data allocated to the three-minute clip from an encoding of the entire movie. An analysis of test data has shown that the first and second amount of data can substantially differ, in practice.

Embodiments of the present disclosure address this problem without having to resort to encoding all thirty movies in their entirety. The multiple clips from the different movies are combined into a single, aggregated piece of video content. VBR pre-encoding, such as two-pass VBR encoding, is performed on the aggregated piece of video content to produce a VBR pre-encoded aggregated video content item. By encoding the aggregated piece of video content in this manner, each clip is encoded within a larger context of the other clips. As a result, more complex clips are encoded using more data while simpler clips are encoded using less data. The total amount of data for encoding the aggregated clips can be the same as for individually encoding the clips, but the distribution of data can vary from clip-to-clip similar to if the clips were taken from fully-encoded movies. Thus, the VBR pre-encoded aggregated video content item has encoded clips that more closely match clips from full-length encodings without requiring the full-length encodings to be generated (e.g. encoding all thirty full-length movies). As a result, a meaningful video quality test can be performed for an encoding of 90 minutes (30 movies×3 minutes/movie) of data rather than 30 full-length movies of data that normally would have been required.

Embodiments of the present disclosure are described with reference to FIG. 1, which is a flow chart of an embodiment of a method of performing a video quality test, and FIG. 2, which is a block diagram of an embodiment of a system for performing a video quality test.

As indicated by block 10, the method comprises VBR pre-encoding an aggregation of a plurality of clips from a plurality of video content items. This act produces a VBR pre-encoded aggregated video content item. Because the aggregation is being VBR pre-encoded, each of the clips is encoded based on an encoding complexity of at least one other one of the clips. In some embodiments, each of the clips is VBR-encoded based on an encoding complexity of the clip relative to encoding complexities of some or all others of the clips. In one embodiment, the act of VBR pre-encoding comprises performing a two-pass VBR-encoding of a single, aggregated piece of video content that concatenates or otherwise combines the plurality of clips. The two-pass VBR-encoding includes a first pass that analyzes the entire single, aggregated piece of video content, and a second pass that encodes the single, aggregated piece of video content based on the analysis.

As described above, the plurality of video content items may comprise a plurality of movies. The movies may comprise cinematic movies, made-for-television movies or other movies produced for a mass audience, for example. The movies may be individually-released and/or individually-purchasable movies. In these cases, each movie normally can be purchased, rented, downloaded or viewed independently of the other movies.

In some embodiments, each clip is of a duration substantially less than a duration of its source video content item. As described above, the duration of a clip may be about three minutes relative to a ninety-minute source video content item.

The duration of each clip is selected to be long enough so that human subjects in a video quality test can become psychologically involved in viewing the clip. However, the duration of each clip is selected to be short enough to avoid prolonging the amount of time each human subject is watching clips and the amount of time needed to encode the aggregated clips. In some embodiments, the duration of each clip is within a range of about one minute to about two minutes. In other embodiments, the duration of each clip is within a range of about one minute to about three minutes.

In some embodiments, some, most or all of the clips have about the same duration. As described above, some, most or all of the clips may have a duration of about three minutes. In alternative embodiments, the clips may have different durations.

The number of clips that are concatenated to form the single, aggregated piece of video content is selected to provide a sufficiently-large sample size to perform a statistical analysis of the human subjects' evaluations of overall quality. However, the number of clips is selected to be small enough to avoid prolonging the amount of time each human subject is watching clips and the amount of time needed to encode the aggregated clips. In some embodiments, the number of clips is within a range of about ten clips to about fifty clips, with thirty clips being used in one embodiment.

Figure 2:
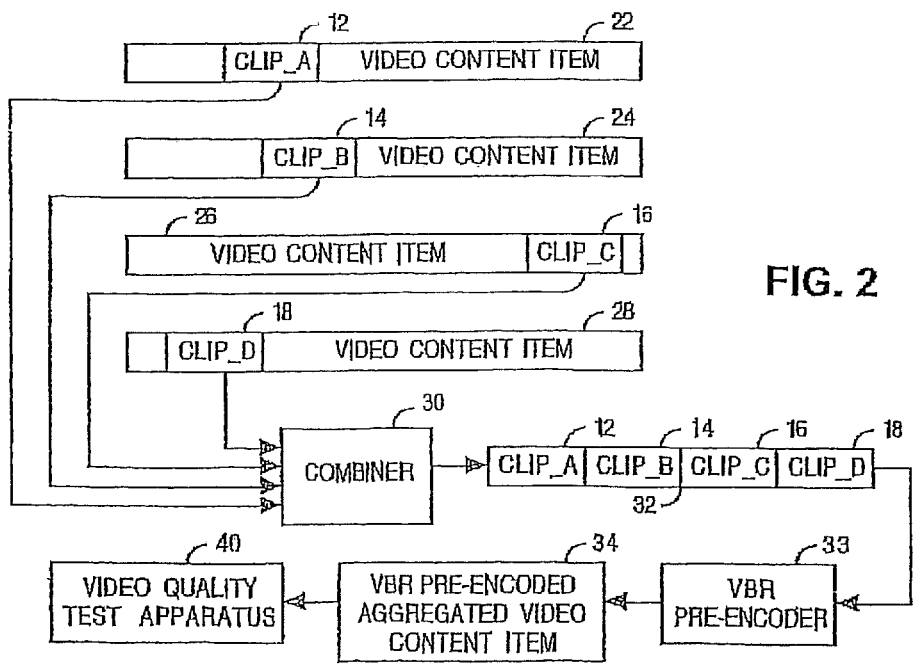
FIG. 2 is a block diagram of an embodiment of a system for performing the video quality test.

For purposes of illustration and example, consider four clips 12, 14, 16 and 18 from four video content items 22, 24, 26 and 28, respectively, as shown in FIG. 2. A combiner 30 concatenates or otherwise combines the four clips 12, 14, 16 and 18 into a single, aggregated piece of video content 32. A VBR encoder 33 VBR-encodes the aggregated piece of video content 32 to produce a VBR pre-encoded aggregated video content item 34. The VBR encoder 33 may perform a two-pass VBR encoding of the aggregated piece of video content 32 to produce the VBR pre-encoded aggregated video content item 34.

After the encoding has completed, the method comprises performing a video quality test using the VBR-encoded aggregated video content item 34, as indicated by block 36. The video quality test is performed by a video quality test apparatus 40 that decodes and plays back the VBR-encoded aggregated video content item 34. The video quality test may be performed using human subjects, who view a display of the decoded content and provide one or more subjective ratings of the video quality. Alternatively, the video quality test may be automated using a computer that rates characteristics of the decoded content.

The acts indicated by blocks 10 and 36 may be repeated for multiple different VBR encoding schemes, parameters and modes. The resulting multiple video quality tests can be analyzed to determine desirable VBR encoding scheme(s), parameter(s) and mode(s) based on one or more video quality objectives and one or more constraints (e.g. bandwidth or bit rate constraints).

In addition to quality testing, the herein-disclosed encoding method and system can be used to enhance the video quality of commercials embedded in longer content items such as television programs or movies. Separately encoding the longer content and the commercials can result in quality discontinuities from content-to-commercials and/or from commercials-to-content. For example, if a relatively complex-to-encode commercial is embedded in a relatively simple-to-encode program, a total amount of data available for a relatively short commercial may be insufficient to encode the commercial with a desirable level of quality. Encoding the aggregated program and commercial would cause the program to be encoded with less data than if encoded individually. The resulting unused data can be applied to the commercial. The resulting quality of the commercial is higher with only a small degradation to the rest of the program. Further, the viewer experiences a more consistent video quality.

The herein-described components may be embodied by one or more computer processors directed by computer-readable program code stored by a computer-readable medium.

Figure 3:
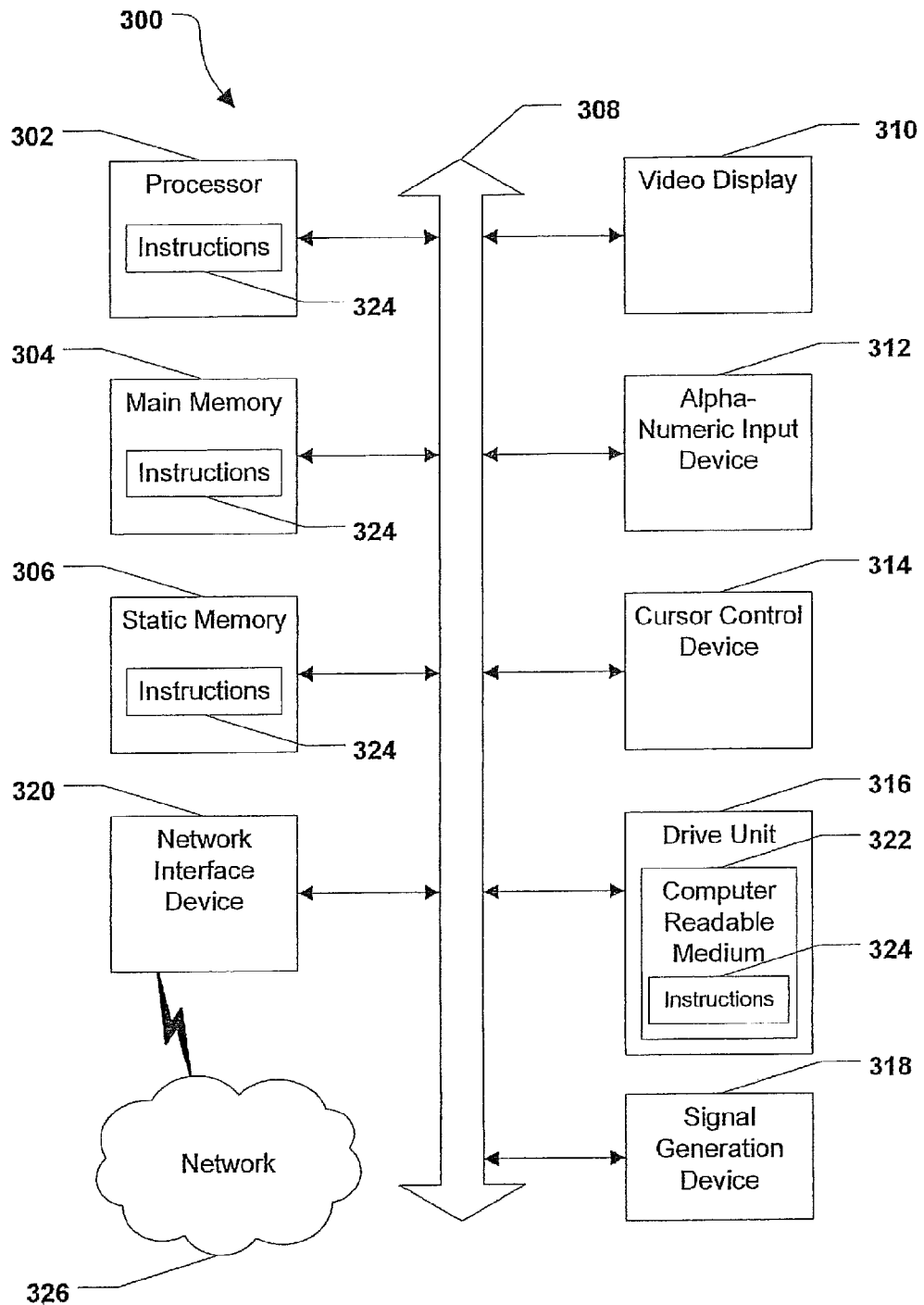
FIG. 3 is a block diagram of an embodiment of a computer system.

Referring to FIG. 3, an illustrative embodiment of a general computer system is shown and is designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. Moreover, the computer system 300 can include a main memory 304 and a static memory 306, that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" may include a non-transitory (e.g. tangible) medium storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a first video clip of a first video content source and a second video clip of a second video content source; and
   variable-bit-rate encoding the first video clip and the second video clip to form a variable-bit-rate encoded aggregated video content item, wherein the variable-bit-rate encoding of the first video clip is based on an encoding complexity of the second video clip, wherein variable-bit-rate encoding the first video clip and the second video clip includes a two-pass variable-bit-rate encoding comprising:
      a first pass that analyzes the variable-bit-rate encoded aggregated video content item, wherein the variable-bit-rate encoded aggregated video content item includes the first video clip and the second video clip; and
      a second pass that encodes the variable-bit-rate encoded aggregated video content item based on the first pass.

2. The method of claim 1, further comprising performing a video quality test using the variable-bit-rate encoded aggregated video content item.

3. The method of claim 2, wherein the video quality test comprises:
   decoding the variable-bit-rate encoded aggregated video content item; and
   analyzing the decoded variable-bit-rate encoded aggregated video content item based on characteristics of the decoded variable-bit-rate encoded aggregated video content item.

4. The method of claim 1, wherein the variable-bit-rate encoded aggregated video content item comprises a plurality of individually-purchasable movies.

5. The method of claim 1, wherein the first video clip and the second video clip have a similar duration.

6. The method of claim 5, wherein the similar duration is about three minutes.

7. The method of claim 1, wherein the first video clip is a commercial.

8. The method of claim 7, further comprising transmitting the variable-bit-rate encoded aggregated video content item over a network to a network interface device.

9. The method of claim 1, further comprising pre-encoding the first video clip and the second video clip.

10. The method of claim 9, wherein pre-encoding the first video clip and the second video clip comprises pre-allocating a specific amount of data corresponding to each of the first video clip and the second video clip prior to forming the variable-bit-rate encoded aggregated video content item.

11. An apparatus comprising:
    a video quality test device operable to perform a video quality test of a variable-bit-rate encoded aggregated video content item, wherein the variable-bit-rate encoded aggregated video content item includes a plurality of clips from a plurality of video content items, wherein an encoding of a particular clip of the plurality of clips is based on an encoding complexity of another clip of the plurality of clips, wherein the variable-bit-rate encoded aggregated video content item is encoded based on a two-pass variable-bit-rate encoding of the plurality of clips comprising:
       a first pass that analyzes the variable-bit-rate encoded aggregated video content item, wherein the variable-bit-rate encoded aggregated video content item includes the plurality of clips; and
       a second pass that encodes the variable-bit-rate encoded aggregated video content item based on the first pass.

12. The apparatus of claim 11, further comprising an encoder operable to variable-bit-rate encode the plurality of clips.

13. The apparatus of claim 12, wherein the encoder is operable to perform the two-pass variable-bit rate encoding.

14. The apparatus of claim 11, wherein the variable-bit-rate encoding of each of the plurality of clips is based on an encoding complexity of each clip relative to encoding complexities of others of the plurality of clips.

15. The apparatus of claim 11, wherein the plurality of video content items comprises a plurality of individually-purchasable and downloadable content items.

16. The apparatus of claim 11, wherein a first clip and a second clip of the plurality of clips have equal durations.

17. The apparatus of claim 16, wherein a duration of the equal durations is less than three minutes.

18. The apparatus of claim 11, wherein the video quality test device comprises a computer operable to rate characteristics of decoded video content.

19. An apparatus comprising:
    a computer-readable storage device storing data corresponding to a variable-bit-rate encoded aggregated video content item, wherein the variable-bit-rate encoded aggregated video content item includes a plurality of video clips, and wherein an encoding of a particular clip of the plurality of video clips is based on an encoding complexity of another video clip of the plurality of video clips, wherein the variable-bit-rate encoded aggregated video content item is encoded based on a two-pass variable-bit-rate encoding of the plurality of video clips comprising:
       a first pass that analyzes the variable-bit-rate encoded aggregated video content item, wherein the variable-bit-rate encoded aggregated video content item includes the plurality of video clips; and
       a second pass that encodes the variable-bit-rate encoded aggregated video content item based on the first pass.

20. The apparatus of claim 19, wherein the variable-bit-rate encoded aggregated video content item is a video program having a plurality of program segments and having at least one embedded commercial segment.

* * * * *